United States Patent
Gibson et al.

(10) Patent No.: US 8,521,618 B2
(45) Date of Patent: *Aug. 27, 2013

(54) METHOD AND SYSTEM FOR ILLUSTRATING WHERE A TICKET IS LOCATED IN AN EVENT VENUE

(75) Inventors: Ashley Gibson, Pacifica, CA (US); Liza Walsh, San Francisco, CA (US); Gabriel Manuel Correa, San Francisco, CA (US); Steven Min Lau, Belmont, CA (US); Benjamin Issasschar Salles, San mateo, CA (US); Sandy Ngo, San Francisco, CA (US); Ronald Levi, San Francisco, CA (US)

(73) Assignee: StubHub, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,599

(22) Filed: Jun. 8, 2012

(65) Prior Publication Data

US 2012/0265652 A1   Oct. 18, 2012

Related U.S. Application Data

(63) Continuation of application No. 12/983,014, filed on Dec. 31, 2010, now Pat. No. 8,209,241, which is a continuation of application No. 11/552,782, filed on Oct. 25, 2006, now Pat. No. 7,917,398.

(51) Int. Cl.
   *G06Q 30/00* (2012.01)

(52) U.S. Cl.
   USPC ... 705/27.2; 705/26.1; 705/26.61; 705/26.62; 705/26.63; 705/27.1

(58) Field of Classification Search
   USPC ............................................. 705/26.1–27.2
   See application file for complete search history.

(56) References Cited

PUBLICATIONS

"The scramble for the best seat in the house" Scott McIennan. Telegram & gazette. Worcester, Mass.: Apr. 27, 2003. p. A.1.*

* cited by examiner

Primary Examiner — Michael Misiaszek
(74) Attorney, Agent, or Firm — Haynes and Boone, LLP

(57) ABSTRACT

A system accepts event criteria for at least one ticket and at least one event; accepts price criteria for the ticket(s) and the event(s); displays an interactive graphics-based event venue map illustrating a location of all sections at a venue with at least one ticket meeting the event and price criteria; accepts section selection criteria, at least one section being selected from the interactive graphics-based event venue map; displays ticket information to allow a user to drill down to a specific ticket, cause a location of the specific ticket to be displayed in the interactive venue map; and enable a capability to utilize the interactive venue map to choose a section of interest, causing corresponding ticket information to be displayed in the web browsing language.

20 Claims, 20 Drawing Sheets

FIG. 1D

FIG. 1H

METHOD AND SYSTEM FOR ILLUSTRATING WHERE A TICKET IS LOCATED IN AN EVENT VENUE

RELATED APPLICATIONS

The present application is a continuation of U.S. patent application Ser. No. 12/983,014, filed Dec. 31, 2010, which is a continuation of U.S. patent application Ser. No. 11/552,782 filed on Oct. 25, 2006. Each of the above applications are incorporated by reference herein their entirety.

BRIEF DESCRIPTION OF THE DRAWINGS

FIGS. 1B-1I are screen shots illustrating features of a system and method of illustrating tickets on an event venue map, according to several embodiments of the invention.

DESCRIPTION OF EMBODIMENTS OF THE INVENTION

A system and method is provided for illustrating where at least one ticket is located in an event venue, comprising: accepting event criteria for at least one ticket and at least one event; accepting price criteria for the at least one ticket and the at least one event; displaying an interactive graphics-based event venue map illustrating a location of all sections at a venue with at least one ticket meeting the event criteria and price criteria; accepting section selection criteria, at least one section being selected from the interactive graphics-based event venue map; displaying ticket information in a web browsing language corresponding to the section selection criteria, the displayed ticket information in the web browsing language being able to be utilized to drill down to a specific ticket, causing a location of the specific ticket to be displayed in the interactive graphics-based event venue map; and enabling a capability to utilize the interactive graphics-based event venue map to choose a section of interest, causing corresponding ticket information to be displayed in the web browsing language. The interactive graphics-based event venue map can be in FLASH, or any other application. The web browsing language can be HTML, or any other language.

According to several embodiments of the invention, any kind of event at any kind of venue can be utilized. Furthermore, ticket information can include listing information (e.g., tickets available for sale), transaction information (e.g., prices at which tickets have been sold), and/or bid information (e.g., prices at which buyers are willing to pay for tickets). The listing information can include: ticket information on at least one ticket sold at a fixed price; ticket information on at least one ticket sold at a declining price; or ticket information on at least one ticket available for auction; or any combination thereof. In addition, the system and method are able to interact with third party sites, and can be utilized with any web enabled software application, whether or not hosted by the same party hosting the method. Furthermore, although the event venue map is interactive, other event venue maps may be illustrated in the system and method that are not interactive, such as, but not limited to, where an exact location corresponding to an exact ticket is shown on a map just prior to purchase.

Figure 1A:
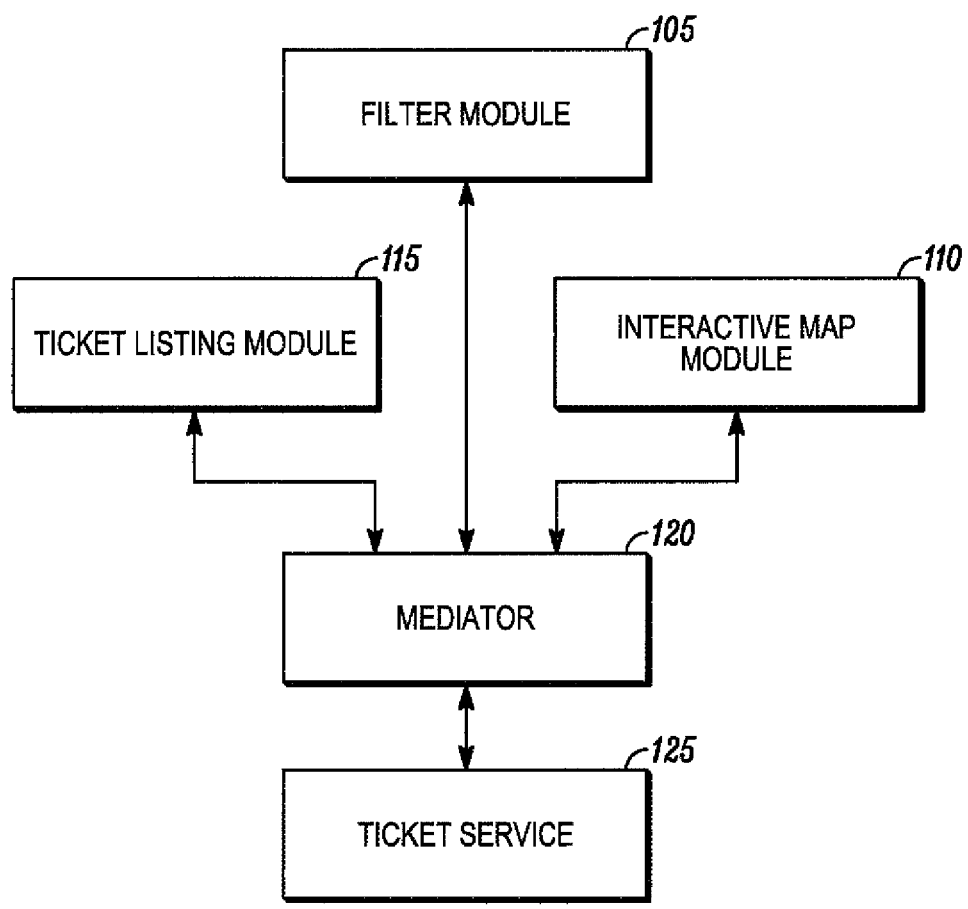
FIG. 1A shows a system of illustrating where a ticket is located in an event venue, according to one embodiment of the invention.

FIG. 1A shows a system of illustrating where a ticket is located in an event venue, according to one embodiment of the invention. In 105, a filter module is presented which allows a user to select pricing and quantity criteria for their ticket search. In one embodiment, the filter module is in a Hypertext Markup Language (HTML) format. In 110, an interactive map module is presented, which can be an interactive map of the venue (i.e., an event venue map) in which the event takes place. In 115, a ticket listing module is presented, which can be a table-based representation of ticket listings. This list can be sorted by section, quantity, row, and/or price.

As a user manipulates the elements in each of these modules by clicking a link or selecting a value from a menu, interaction events are generated, causing a message to be dispatched to mediator 120, which is the application that executes in the client web browser. Mediator 120 is responsible for interpreting each interaction event and making the appropriate communication with the other modules.

The filter module 105 presents the user with a form containing a variety of input elements. These elements allow the user to filter the ticket listing module and map according to event, price, and quantity. In one embodiment, an end user can use event dropdowns, price bucket checkboxes, and quantity dropdowns to build a set of filter criteria. This criteria set is used to explicitly request filtered tickets via a find or search button present in the filter module 105. In one embodiment, the filter module 105 will reset any work done on the interactive map module 110. This find or search button dispatches a message to the mediator 120, described in more detail below.

The interactive map may provide several interactive elements to the user. It can provide a transparent box with section summary information, presented when a user hovers their mouse over a section. It can also provide also a visual representation (map) of the event venue, broken up into sections. Additionally, it can provide a color-coded aggregation of sections into "zones", such as "bleacher" or "loge". These zones are displayed as a list of small colored boxes, outside the map itself. The colors of each zone box correspond to the colors of each section within that zone. When a section has inventory, the section is colored in on the map with the color of its parent zone.

There are several actions that a user can take via the interactive map. For example, a mouse can be clicked on an individual section or on one of the aggregate zone boxes. In each case, a message is dispatched to the mediator 120. For clicks on an individual section, this message contains the id of the section clicked. For clicks on a zone, the message contains the IDs of all the sections that have this zone as their "parent."

The ticket listing module 115 presents an interactive element to the user: a "sort" link, which can be present at the top of each column. Clicking one of these links will dispatch a message to the mediator 120, described below.

As described above, interaction events are dispatched to the mediator 120, a custom javascript application that executes in the user's web browser. The mediator 120 is responsible for interpreting these messages, constructing a ticket service request, interpreting a ticket service response, and updating the interactive modules accordingly.

The mediator 120 exposes a simple Application Programming Interface (API) that each module can call when an appropriate interaction event is used. The mediator 120 accepts data via this API and uses it to maintain a persistent internal representation of what a user is requesting. Maintaining this state allows the ability for a user to leave a page and return, without losing all of their filtering work. The latest requested set of filter actions is saved, and used to reconstruct the previous session if a user returns to the page. In addition, the requests the mediator 120 makes to the ticket service 125 can be split into at least two distinct types: filtering tickets by criteria, and retrieving tickets by section IDs. These two request types can exist in a hierarchy, or can be performed independently.

A filter tickets by criteria request can operate against the universe of tickets in the venue, clearing any previously supplied section ID criteria. A retrieve tickets by section ID request, on the other hand, can operate only against the filtered ticket set, assuming filter criteria is present.

After receiving a message from one of the primary modules, the mediator 120 will assemble an appropriate request string, and initiate an HTML request to the ticket service 125. The ticket service 125 will interpret this request to determine the nature of ticket retrieval and filtering requested, execute the request, and return an Extensible Markup Language (XML) data set representing the tickets that match the criteria supplied by the mediator 120.

Upon receiving the returned ticket data, the mediator 120 can parse the returned data to extract summary data about the response set, which it uses to update some display areas. These areas include, but are not limited to, the "total tickets" information provided at the top of the listing, as well as the pagination links. It also extracts a list of all section IDs that the current ticket response data matches. The mediator 120 can pass this list to the interactive map module 110, which updates itself to only color the sections that are relevant for the returned result set. Along with updating the interactive map, the mediator 120 also parses the full listing of tickets and dynamically redraws the ticket listing accordingly. At this point, the application is ready to receive new interaction events, and the cycle repeats.

Figure 1B:
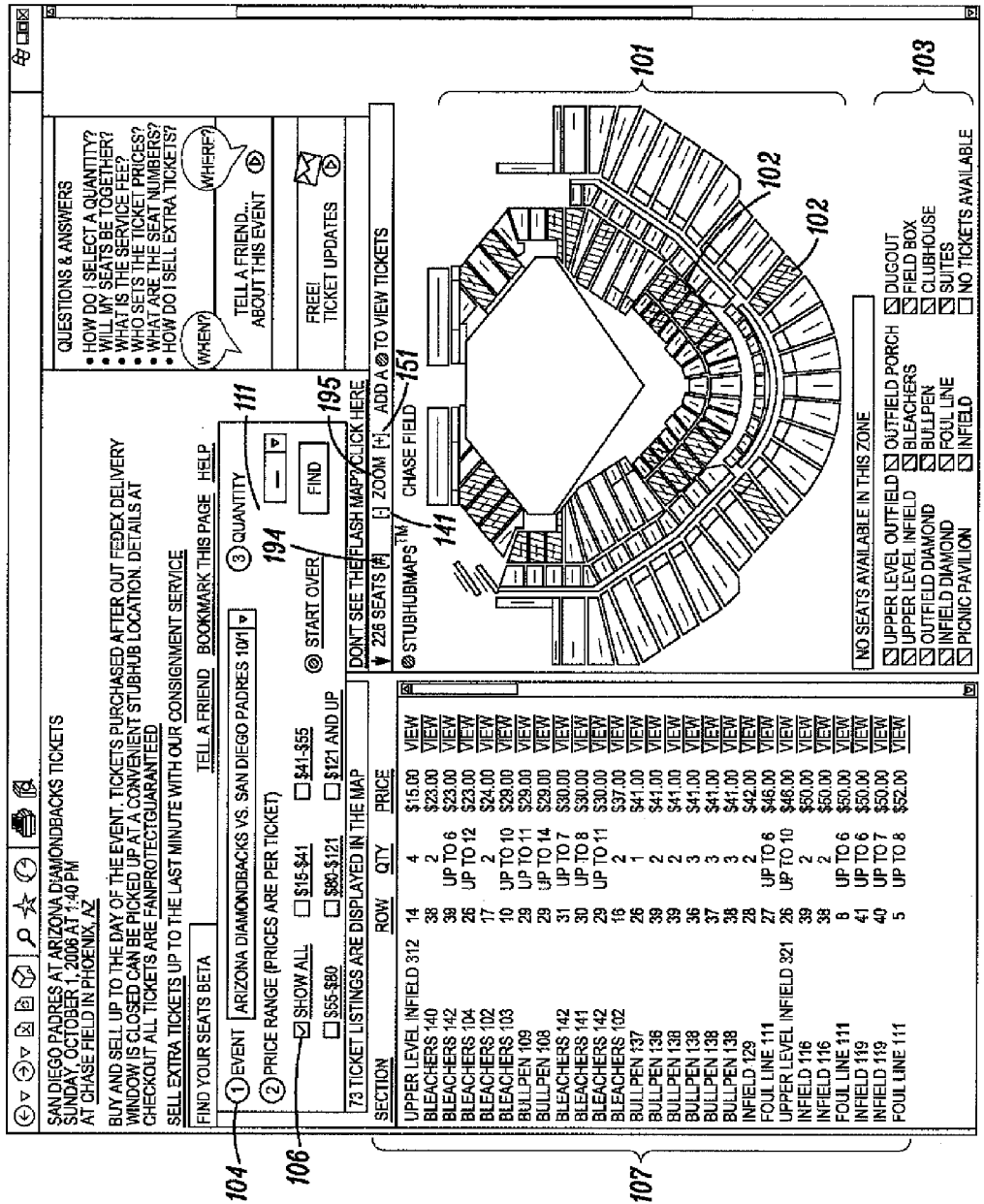
Figure 1C:
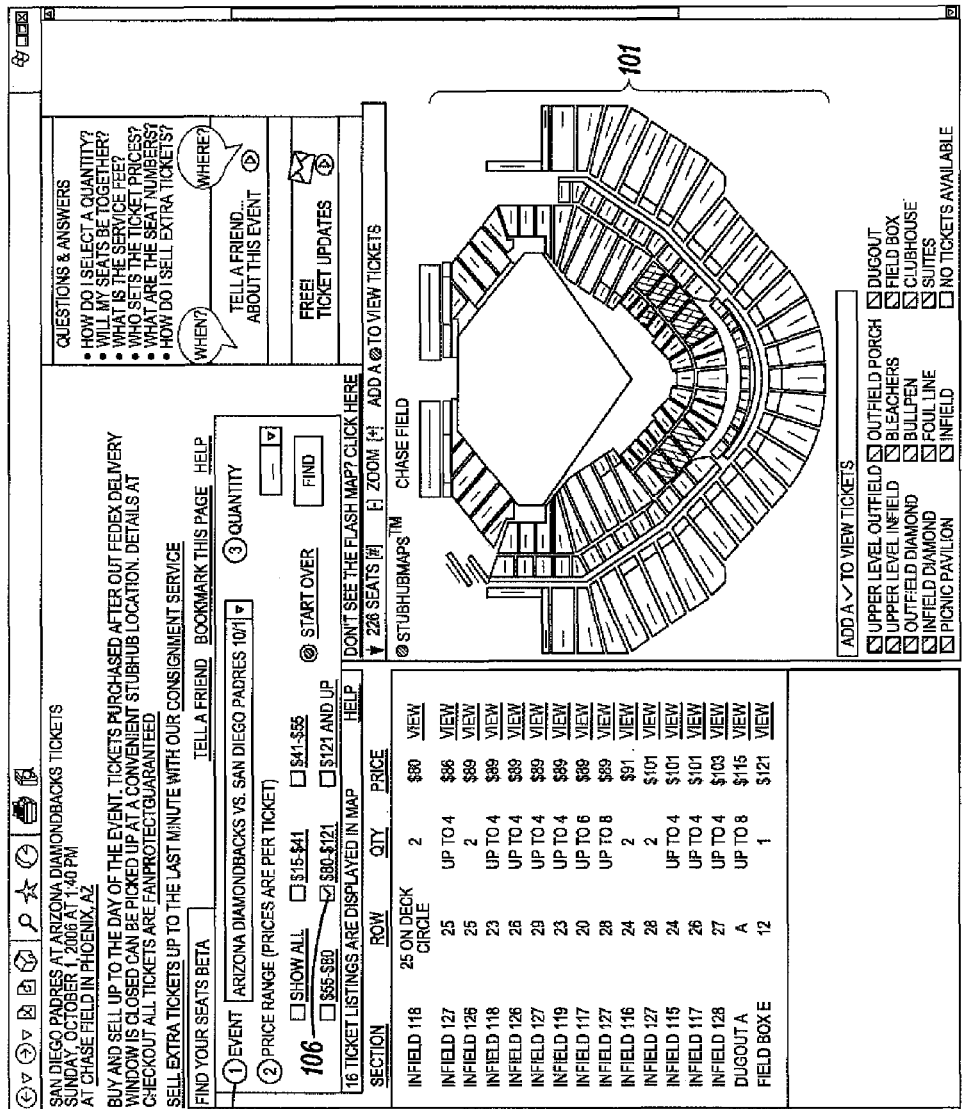
Figure 1D:
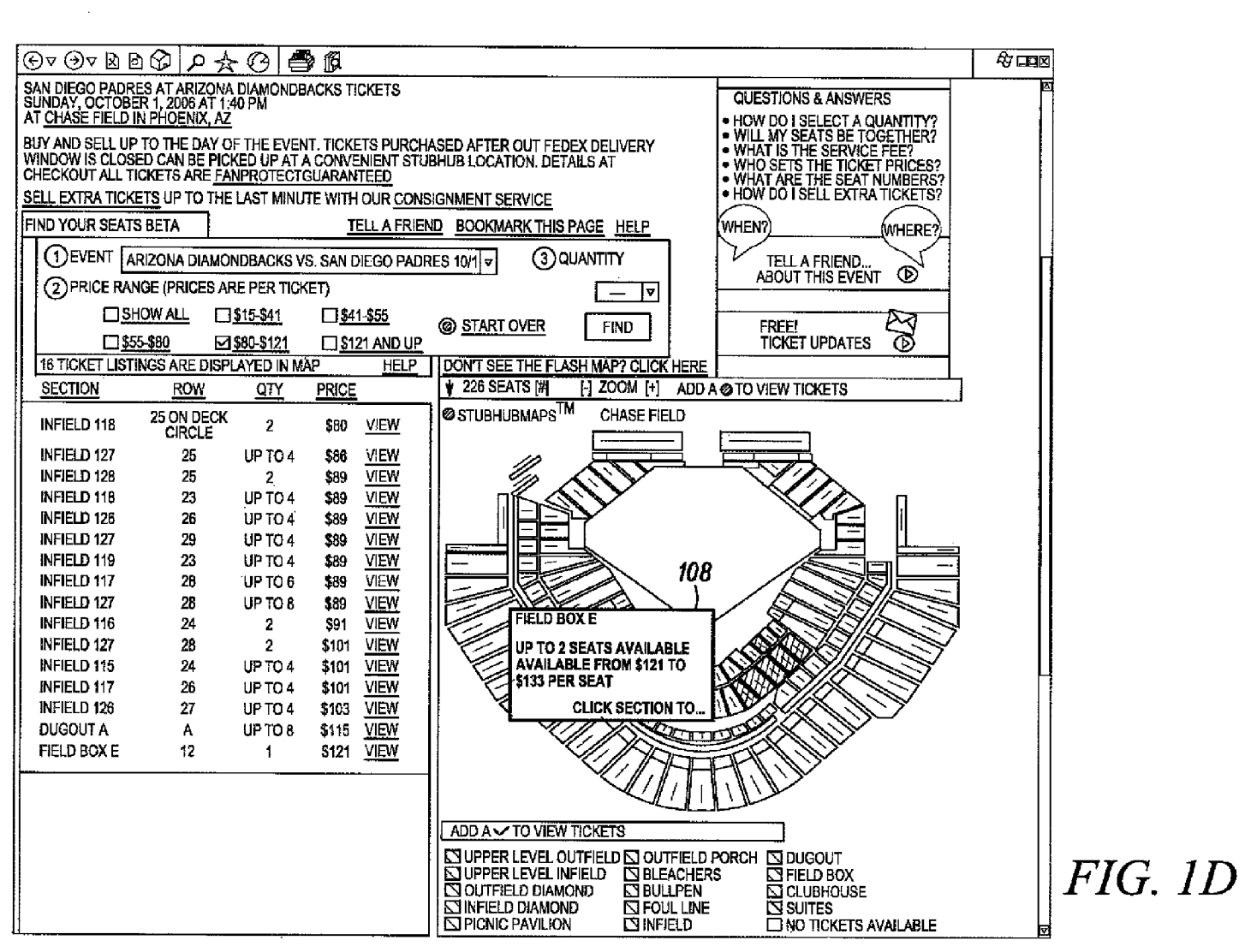
Figure 1E:
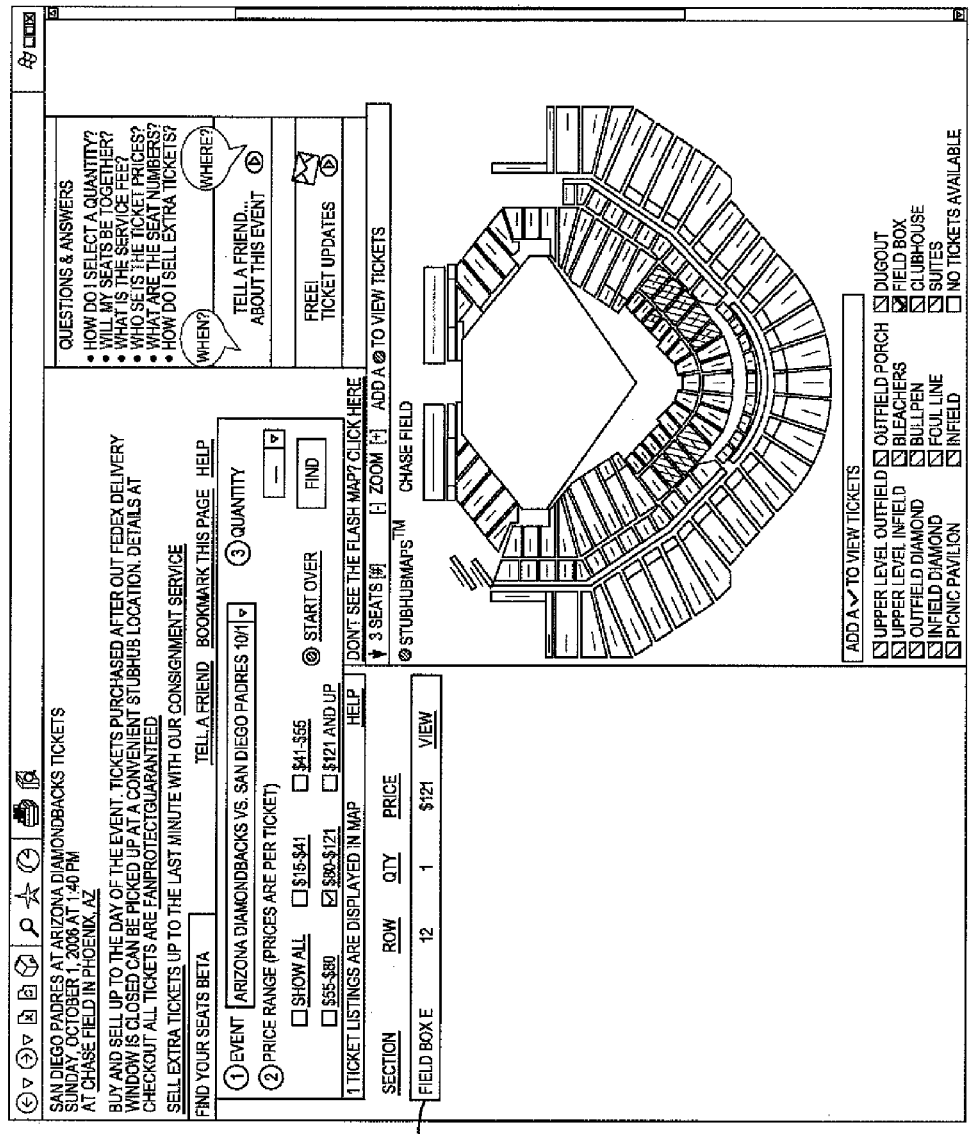
Figure 1F:
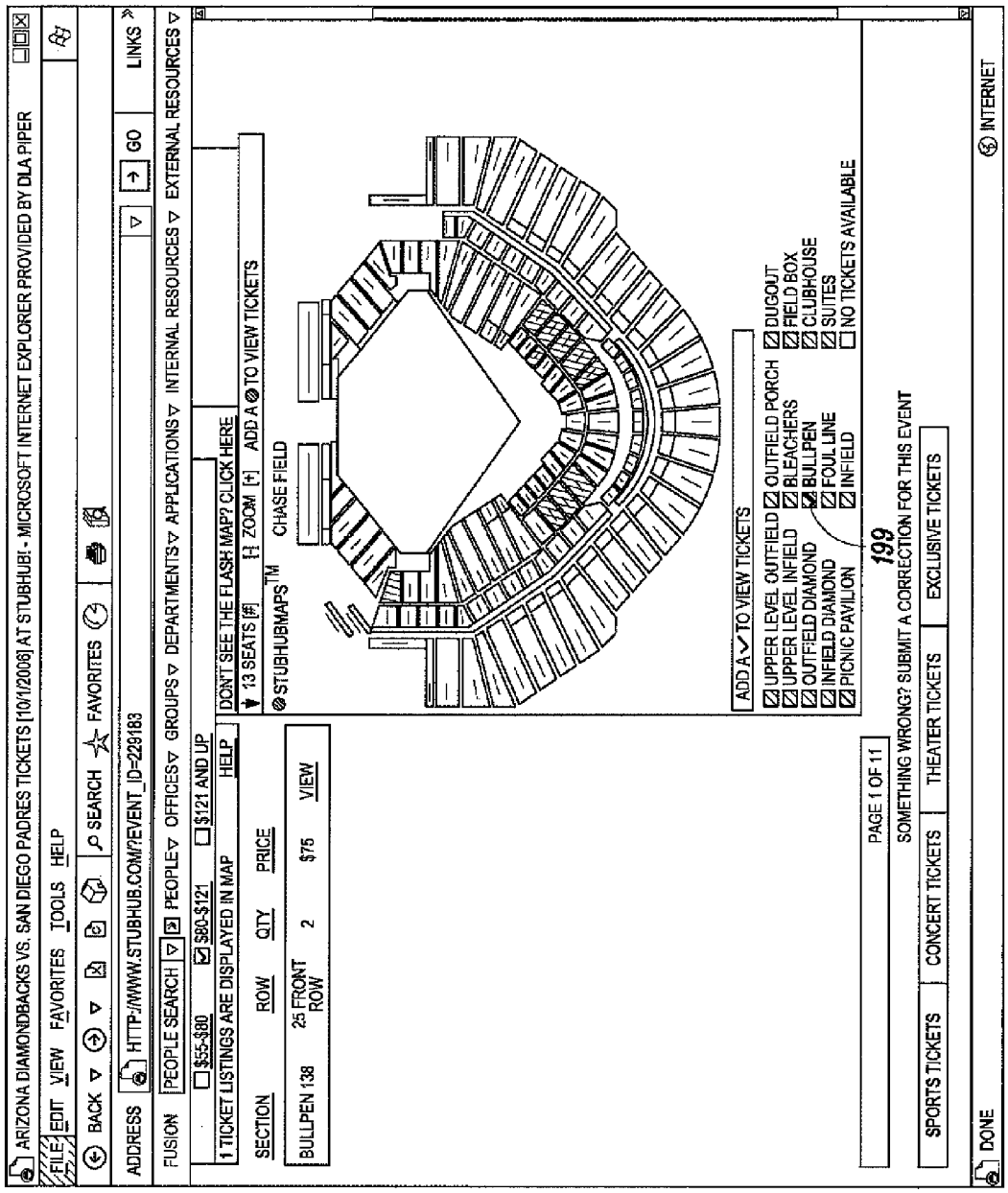
Figure 1G:
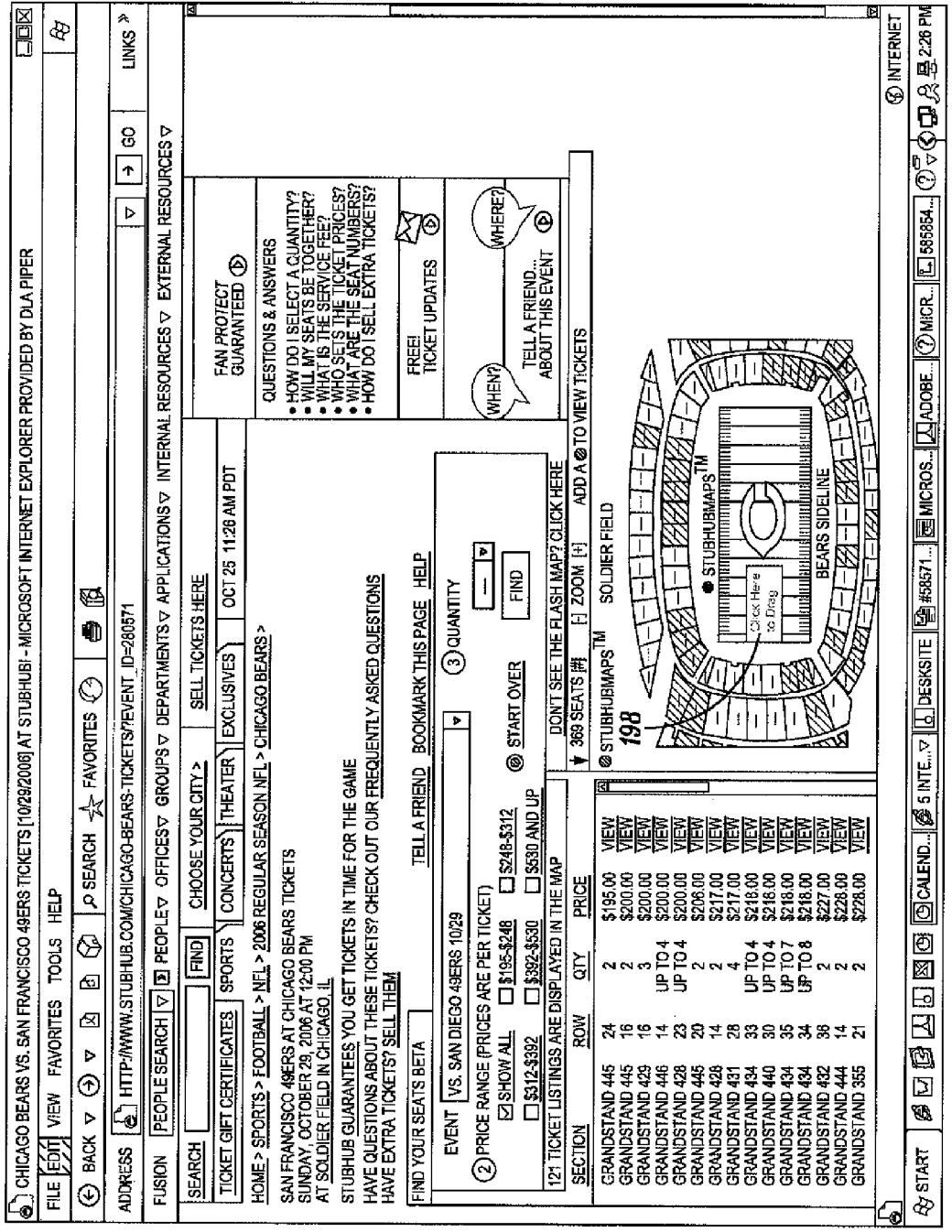
Figure 1H:
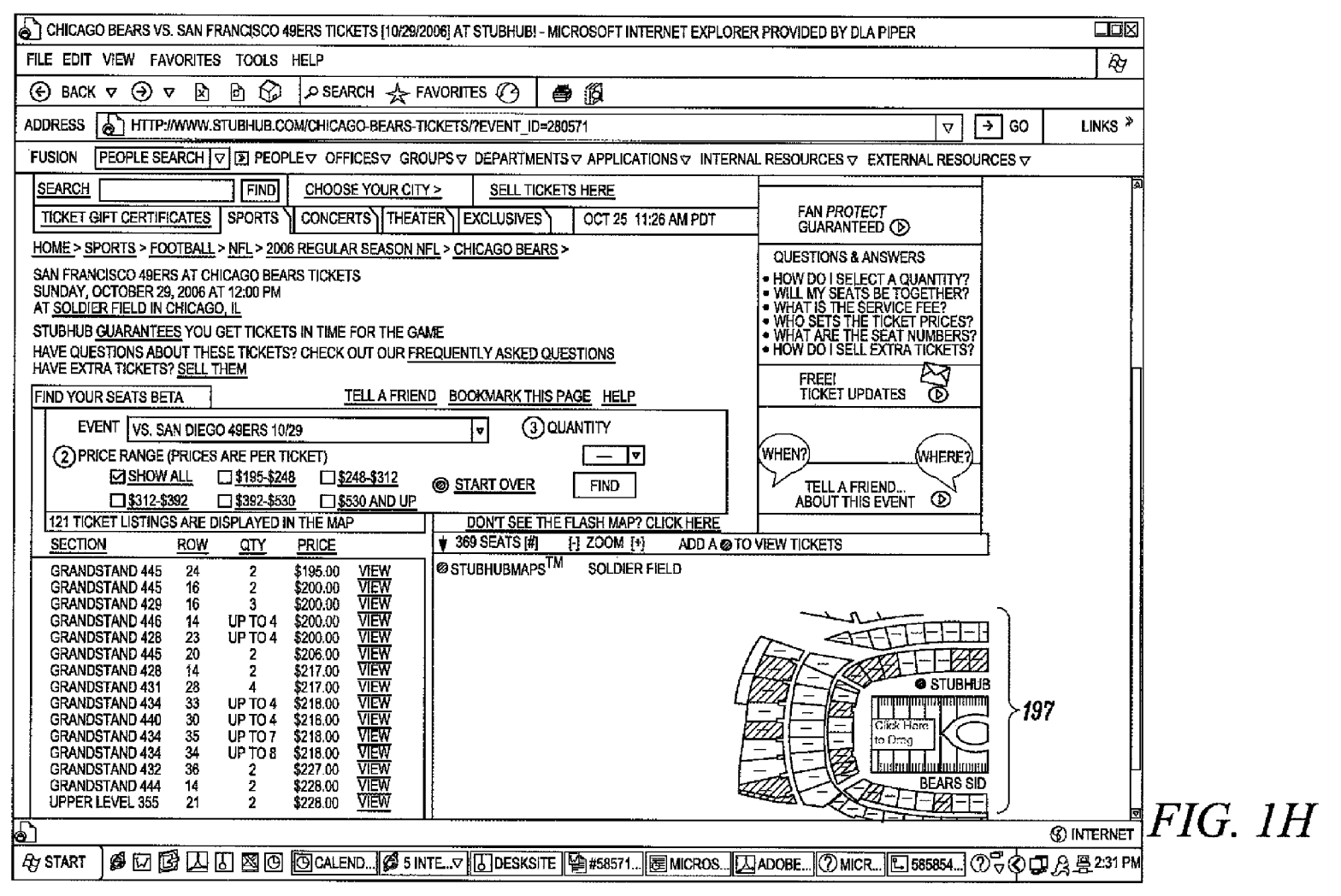

FIGS. 1B-1I are screen shots illustrating features of a system and method of illustrating tickets on an event venue map, according to several embodiment of the invention. In FIG. 1B a user is able to select an event 104. The user is also able to select a price range 106, which can include all price ranges, or a designated price range and a quantity 111. Once the user selects a price range, the event venue map 101 is shown with sections with available tickets (or tickets otherwise of interest) colored in. In one embodiment, the colors used in the sections correspond to which zone the section is in. A zone 103 comprises several sections 102 that are similarly located, and can coincide with designation the venue uses. Available tickets in the sections designated on the event venue map 101 are listed in 107. Zoom minus 141, zoom plus 151, zoom scale 195, and section names 194 features are described in more detail later. (See FIGS. 4-8.) FIG. 1C is a screen shot where only one price range 106 has been designated, the price range of $80-$121. The event venue map 101 illustrates the sections on the map where tickets in the $80-$121 range are available for sale. In 107, tickets available in the sections designated on the event venue map 101 are listed. FIG. 1D illustrates a dragger rollover screen 108, which allows the user to scroll over a particular section and see how many tickets are available in that section, and the price range of the tickets. Thus, in this example, in Field Box E, the user can easily and quickly see that up to 2 seats are available in this section, and are priced between $120 and $133. FIG. 1E illustrates a list of tickets in Field Box E, which is shown when the user clicks on the dragger rollover screen 108. This list shows the exact location of the ticket and the exact price. FIG. 1F illustrates an option of choosing a zone (in this example, the bullpen zone 199) and displaying the tickets available in this zone. FIG. 1G illustrates a "Click Here to Drag" dragger feature 198, which allows a user to drag the map. FIG. 1H illustrates the use of the "Click Here to Drag" feature, showing a moved map 197. FIG. 1I illustrates the use of a rotating pinwheel feature 196.

Figure 2:
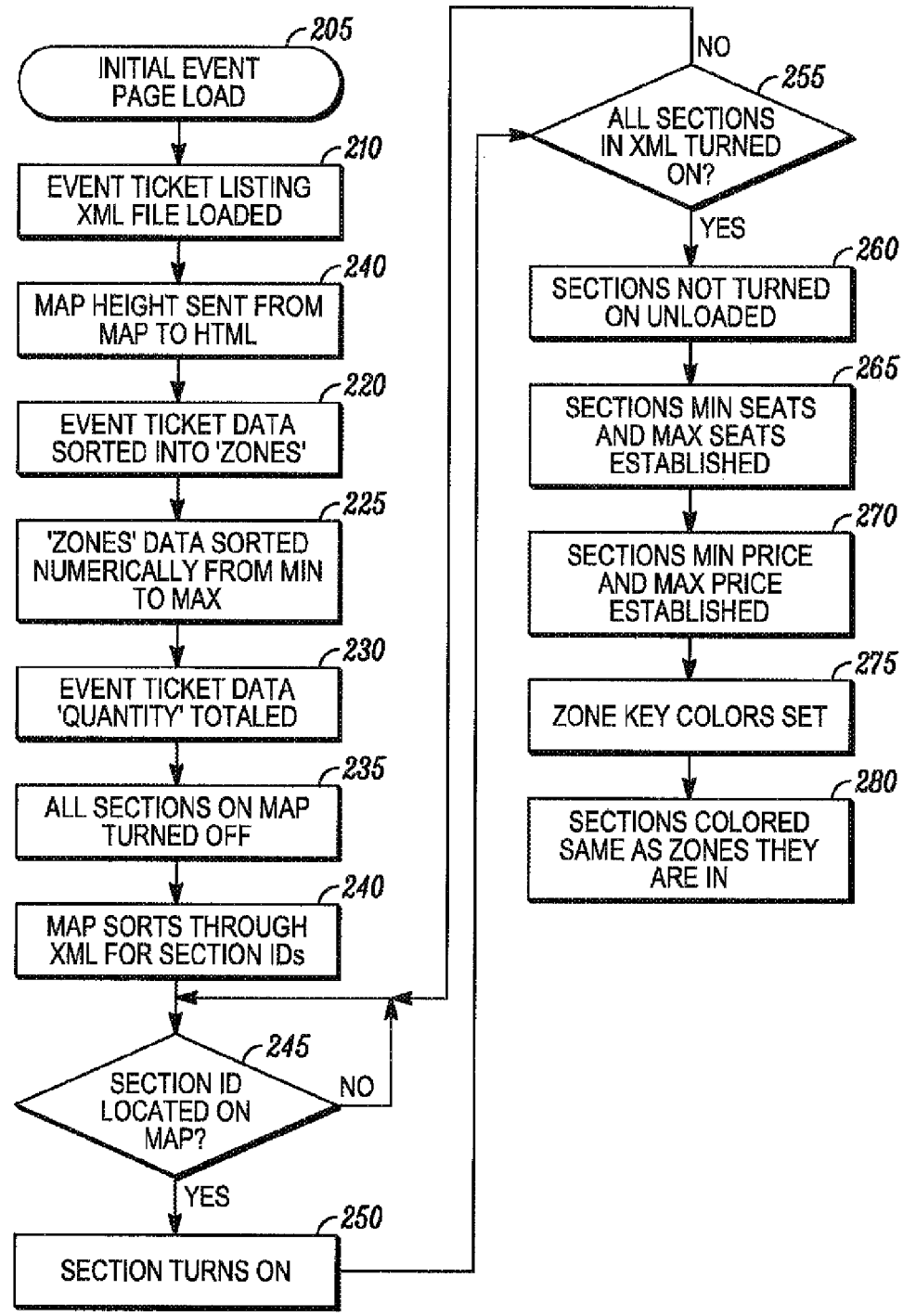
FIG. 2 shows a method of illustrating where a ticket is located in an event venue, according to one embodiment of the invention.

FIG. 2 shows a method of illustrating where a ticket is located in an event venue, according to one embodiment of the invention. In 205, the event page is loaded in interactive map module 110. In 210, the XML event ticket listing file is loaded in HTML ticket listing module 115. This is a list of tickets available for sale for a certain event. In 215, the height of the event venue map is sent from the FLASH (i.e., vector graphics file format which adds animation and interactivity to web pages) interactive map module 110 to the HTML ticket listing module 115. This is done because each event venue map has a height different from other event venue maps. In order for elements in the HTML page to get placed properly around the event venue map, the event venue map has to "tell" the HTML how tall it is. Every event venue map thus has a variable set to its height, which is passed to the HTML on initial page load. In 220, the event ticket data (i.e., tickets available for sale) is sorted into zones, which are different areas of the venue which are similarly located. Each zone can have many sections contained in that zone. In 225, zone data is sorted numerically from minimum to maximum. Thus, for example, the tickets are sorted from low prices to high prices. Auction prices can be sorted, in one embodiment, according to a current auction price. In 230, the quantity of event ticket data is totaled. This indicates how many tickets are available in each section and/or certain zone. In 235, all sections on the map are turned off (i.e., no sections are filled in) so that when the user first performs a search, he has a clear screen. In 240, the map sorts through the XML file for any section IDs chosen by the user, which correspond to available tickets. In 245, it is determined if any of the section IDs are located on the map. If a section ID is not located on the map, it is not turned on, and the program ignores it and moves back to 240 to test the next section. If a section ID is located on the map, it is turned on in 250 and is filled in on the map. An example of sections turned on when available tickets are found is illustrated in FIG. 1B. FIG. 1B illustrates an event venue map 101, according to one embodiment of the invention. The shaded sections designate sections 102 where available tickets are for sale. In one embodiment, similarly situated sections can be combined into different zones, which are designated at 103. In 255, it is determined if all sections are turned on. This is a test to see if every section in the event's inventory has been mapped. If all inventory for the event has been checked and mapped, then the program moves to 260. If all sections in the event inventory have not yet been read and mapped, the program goes back to 240 and continues to check the sections to see if they need to be turned on. In 260, the sections not turned on are unloaded in order to lighten the processing stress needed to run the venue map. In 265, the minimum number of seats and the maximum number of seats in a section is determined. In 270, a minimum price and a maximum price for seats in a section are established. In 275, colors are set for zones, which as described above, can include several similarly situated sections. In 280, all sections in the same zone are colored the same color.

Figure 3:
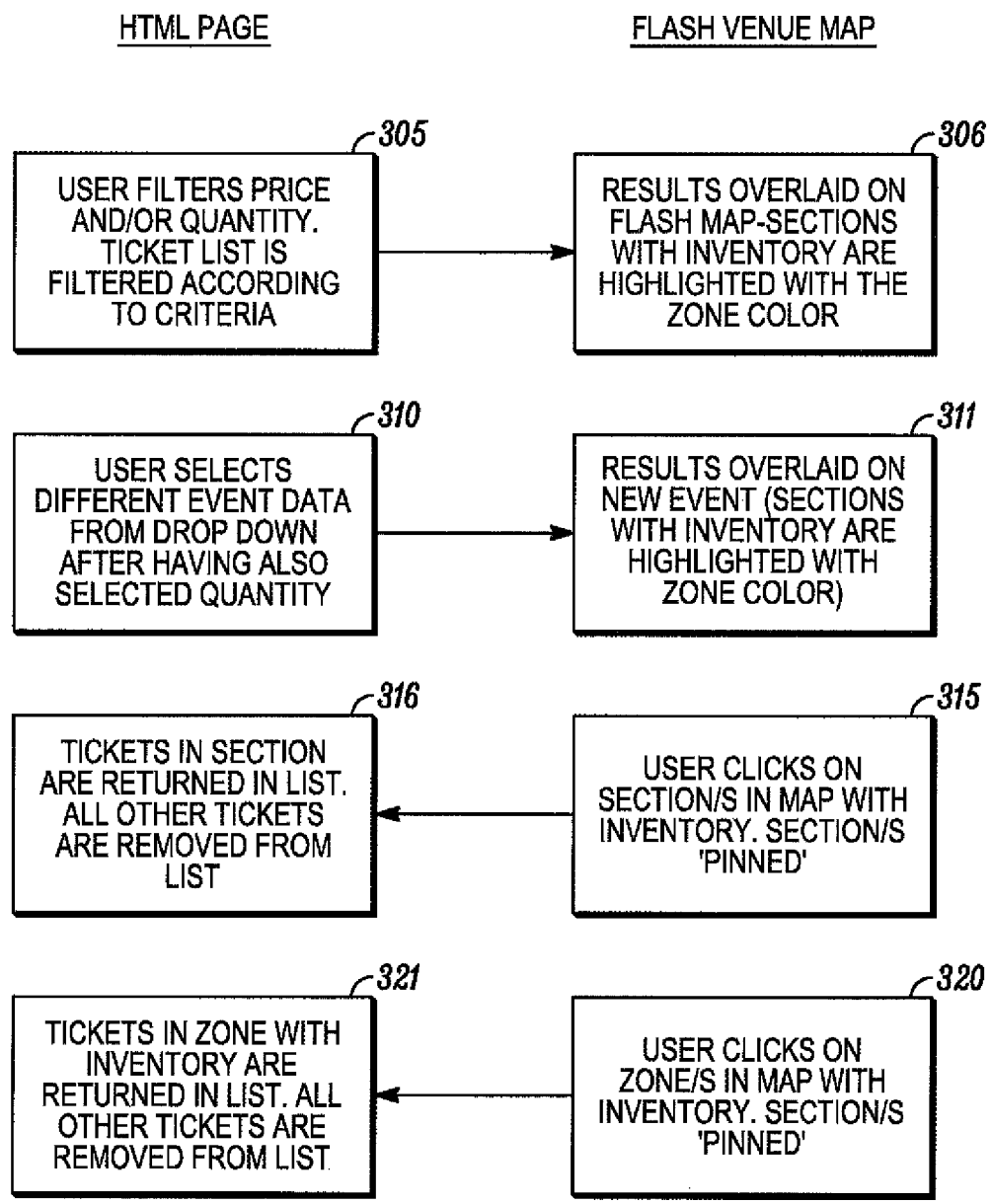
FIG. 3 illustrates methods of correlating the HTML page of the list of tickets (in ticket listing module 115) with the FLASH event venue map (in interactive map module 110), according to one embodiment of the invention.

FIG. 3 illustrates methods of correlating the HTML page of the list of tickets (in ticket listing module 115) with the FLASH event venue map (in interactive map module 110), according to one embodiment of the invention. In 305, the user filters price and/or quantity. The ticket list is filtered according to the criteria. In 306, the results are overlaid on the FLASH event venue map. The sections with available tickets are highlighted with the appropriate zone color. In 310, the user selects different event data from a drop down menu after having also selected a certain quantity of tickets. In 311, the results are overlaid on the new event. The sections with inventory are highlighted with the appropriate zone color. In 315, a user clicks on sections in the map with available tickets. These sections can be designated as pinned. In 316, the tickets in the section are returned in the list. All other tickets are removed from the list. In 320, the user clicks on zones in the map with inventory. These sections can be designated as pinned. In 321, the tickets in the zone with inventory are returned in the list. All other tickets are removed from list.

Figure 4:
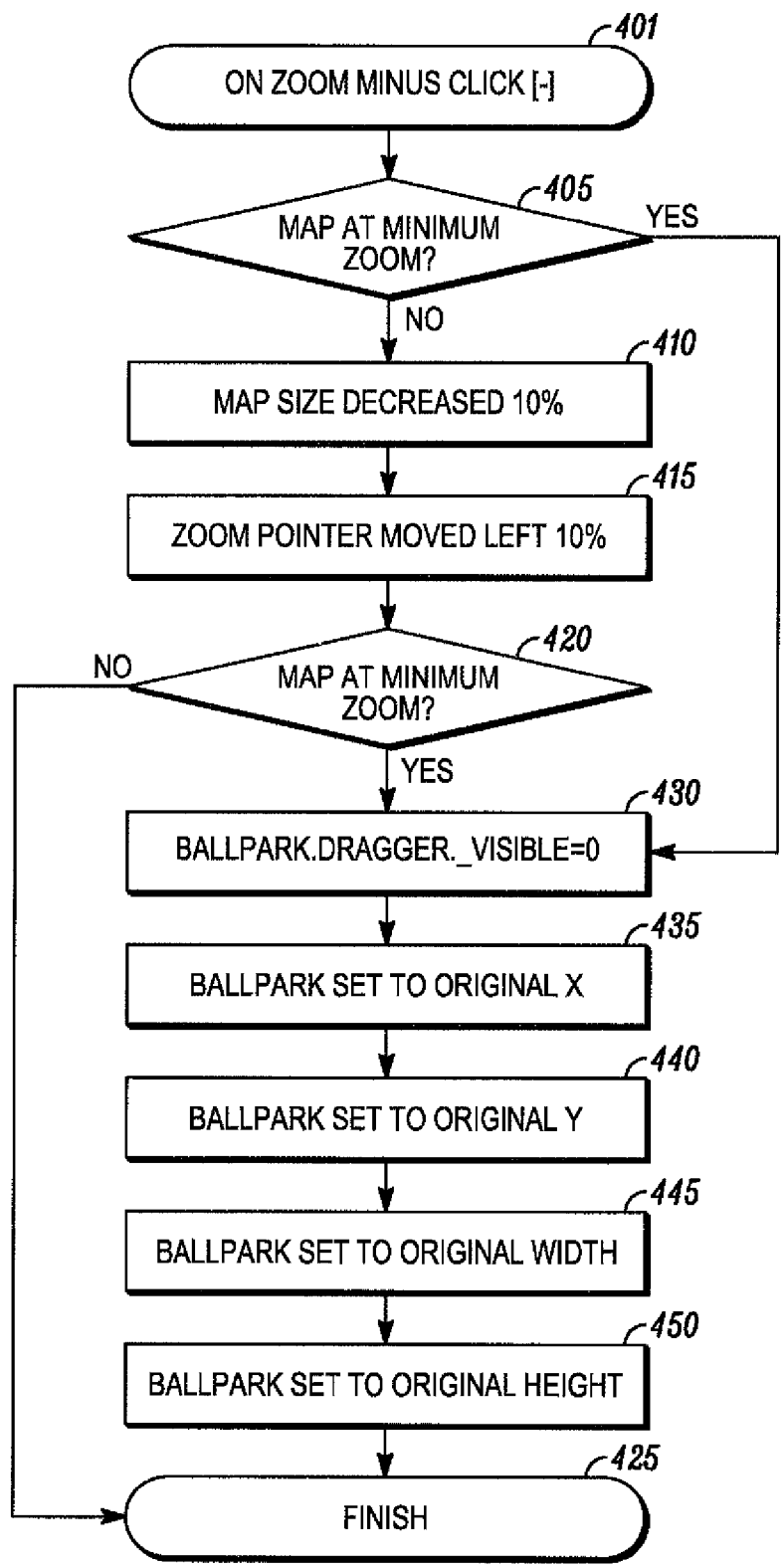

FIGS. 4-13 illustrate different optional features of the event venue map, according to several embodiments of the invention. FIG. 4 illustrates the zoom minus feature, according to one embodiment of the invention. The zoom minus feature 141 is illustrated in FIG. 1B. Referring to FIG. 4, in 401, the zoom minus feature is chosen. In 405, it is determined if the event venue map is at minimum zoom. If no, in 410, the map size is decreased by 10%. In 415, the zoom pointer is moved to the left 10%. In 420, it is determined if the map is at minimum zoom. If not, the process is finished in 425.

If, in step 405 or step 420, it is determined that yes, the event venue map is already at minimum zoom, then the process moves to 430. In 430, the ballpark.dragger_visible=0. This means that the dragger is made invisible. In one embodiment, the dragger says "Click Here To Drag", and appears when the event venue map is zoomed in and is used during a prolonged click by the user to move the map around in order to get a better view of the sections. The dragger features are illustrated in FIGS. 1G and 1H. The dragger is no longer needed when the map is zoomed out to its minimum. In 435, the ballpark is set to original X. In 440, the ballpark is set to original Y. In 445, the ballpark is set to original width. In 450, the ballpark is set to original height. Thus, if in 405 or 420, it is determined that the event venue map is a its minimum zoom, then steps 435 and 450 return the event venue map to the zoom setting it was at in 401, which is the minimum zoom.

Figure 5:
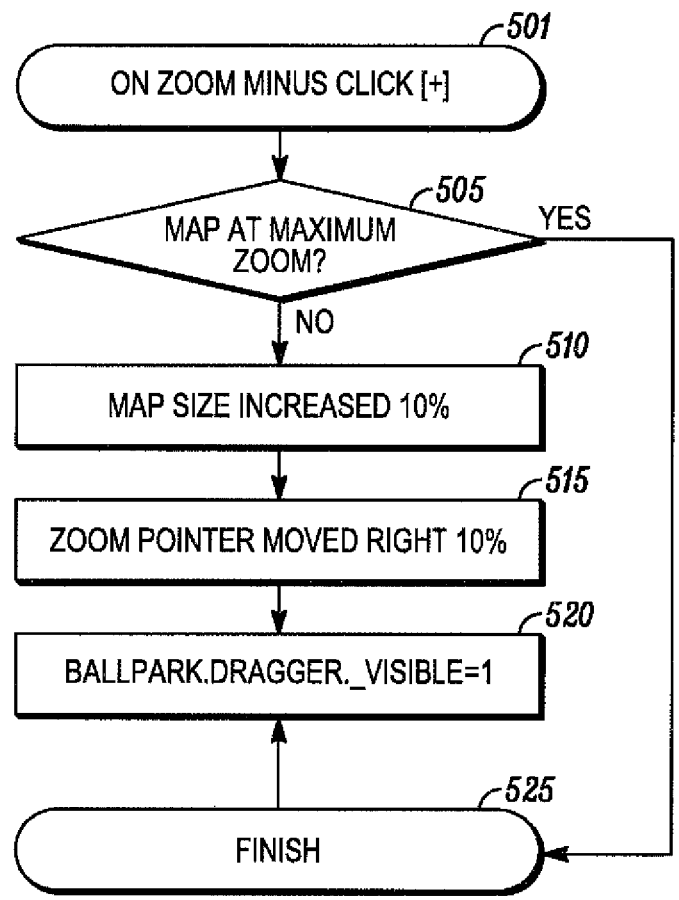

FIG. 5 illustrates the zoom plus feature, according to one embodiment of the invention. The zoom plus feature 151 is illustrated in FIG. 1B. Referring to FIG. 5, in 501, the zoom plus feature is chosen. In 505, it is determined if the event venue map is at maximum zoom. If no, in 510, the map size is increased by 10%. In 515, the zoom pointer is moved to the right 10%. In 520, the ballpark.dragger_visible=1. This means that the dragger "Click Here To Drag" is made visible and available. The process is finished in 525.

Figure 6:
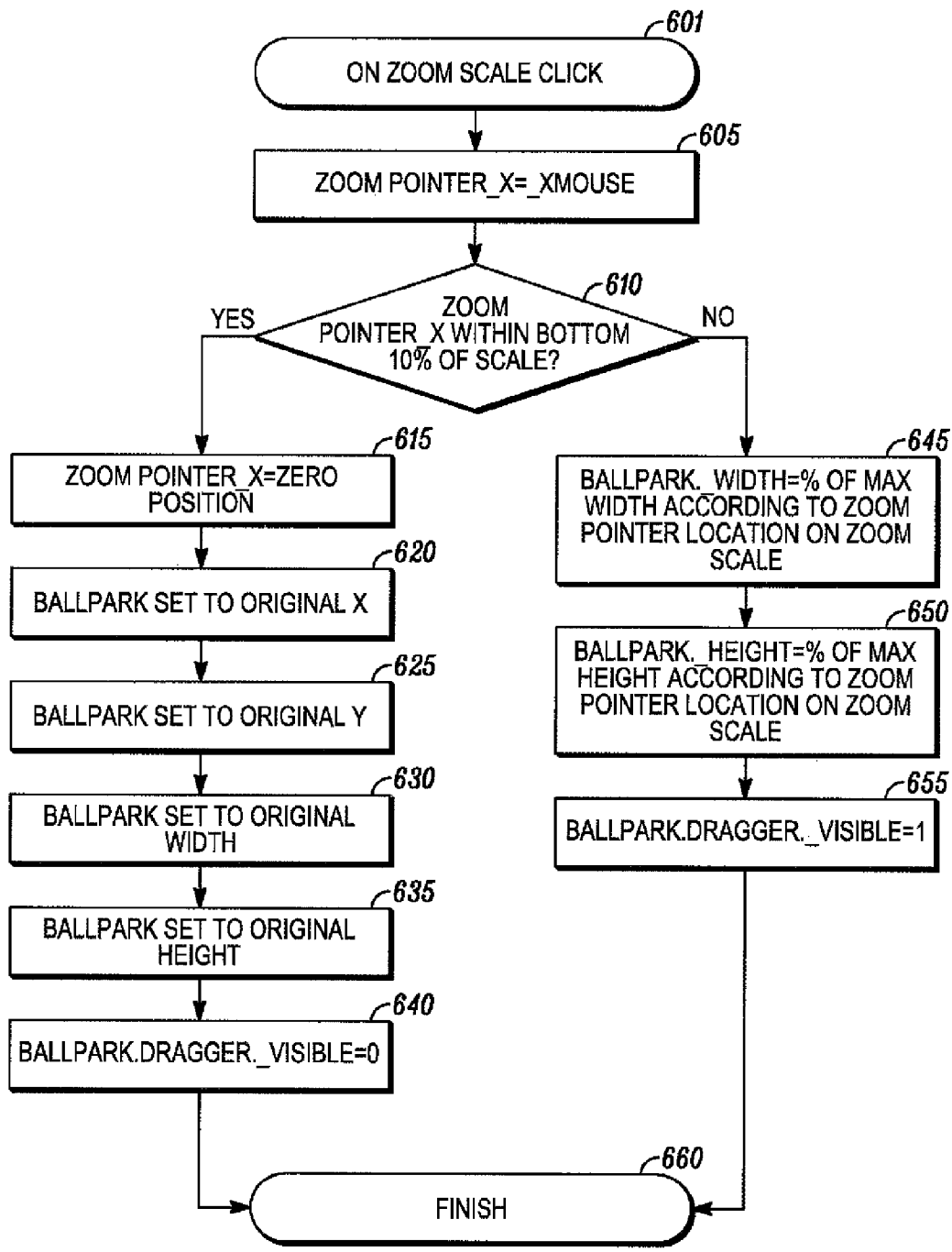

FIG. 6 illustrates the zoom scale feature 195 (which is the same as the on zoom pointer release), according to one embodiment of the invention. The zoom scale feature 195 is also illustrated in FIG. 1B. The zoom scale feature allows a user to use a sliding scale to increase or decrease the zoom, as opposed to using the zoom plus 151 or zoom minus 141 feature. Referring to FIG. 6, in 601, the zoom scale feature is turned on by clicking on the sliding scale. In 605, the ballpark is set to the X of the scale chosen by the user's mouse using a pointer. In 610, it is determined if the pointer is within the bottom 10% of the scale. If yes, in 615, the pointer is set to the zero position. In 620-635, the ballpark is set to its original X, Y, width and height. In 640, the ballpark dragger is then set to 0, or off, and is invisible. This is done because the dragger is no longer needed when the ballpark is zoomed to its minimum. If, in 610, it is determined that the zoom pointer is not within the bottom 10% of the scale, in 645 and 650, the ballpark width is set to the percentage of the maximum width and height that corresponds with the pointer location on the zoom scale 195. In 655, the ballpark dragger is set to 1 or on, and is visible. In 660, the process is finished.

Figure 7:
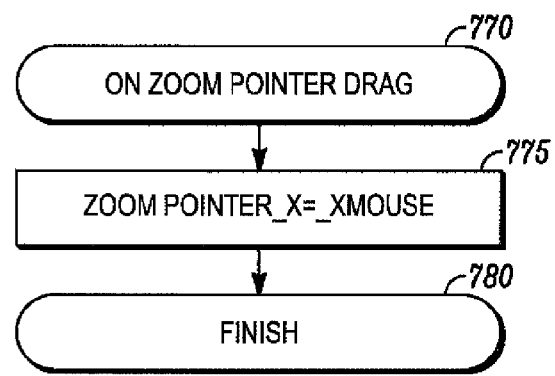

FIG. 7 illustrates the zoom pointer drag, according to one embodiment of the invention. The zoom pointer drag allows the user to drag the pointer on the zoom scale. In 770, the zoom pointer is turned on when the moves the zoom pointer. In 775, the zoom pointer is set to the position x of the mouse on the zoom scale 195. In 780, the process is finished.

Figure 8:
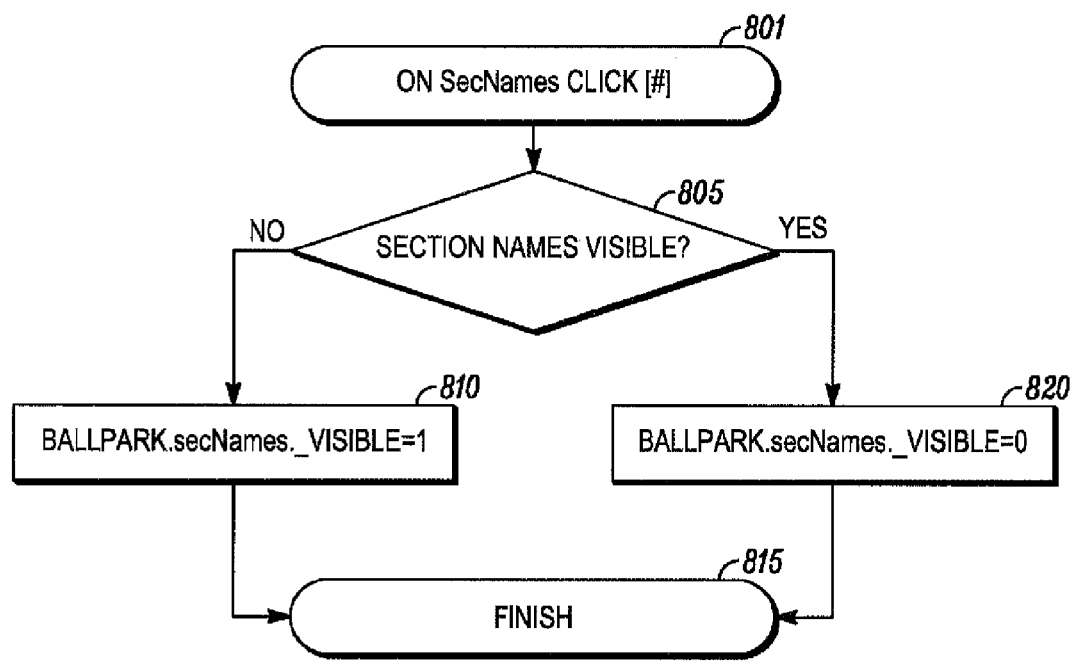

FIG. 8 illustrates the section names feature 194, according to one embodiment of the invention In one embodiment, the section names feature 194 is illustrated by a pound sign between two brackets (i.e. [#]), as illustrates in FIG. 1B. Clicking on this feature turns all the section names and numbers off and on, depending on its current state at the time of the click. Thus, in 801, the user clicks on the section names feature. In 805, it is determined if the section names feature is visible. If yes, in 820, the section names feature is set to off (=0). If no, in 810, the section names feature is set to on (=1). In 815 the process is finished.

Figure 11:
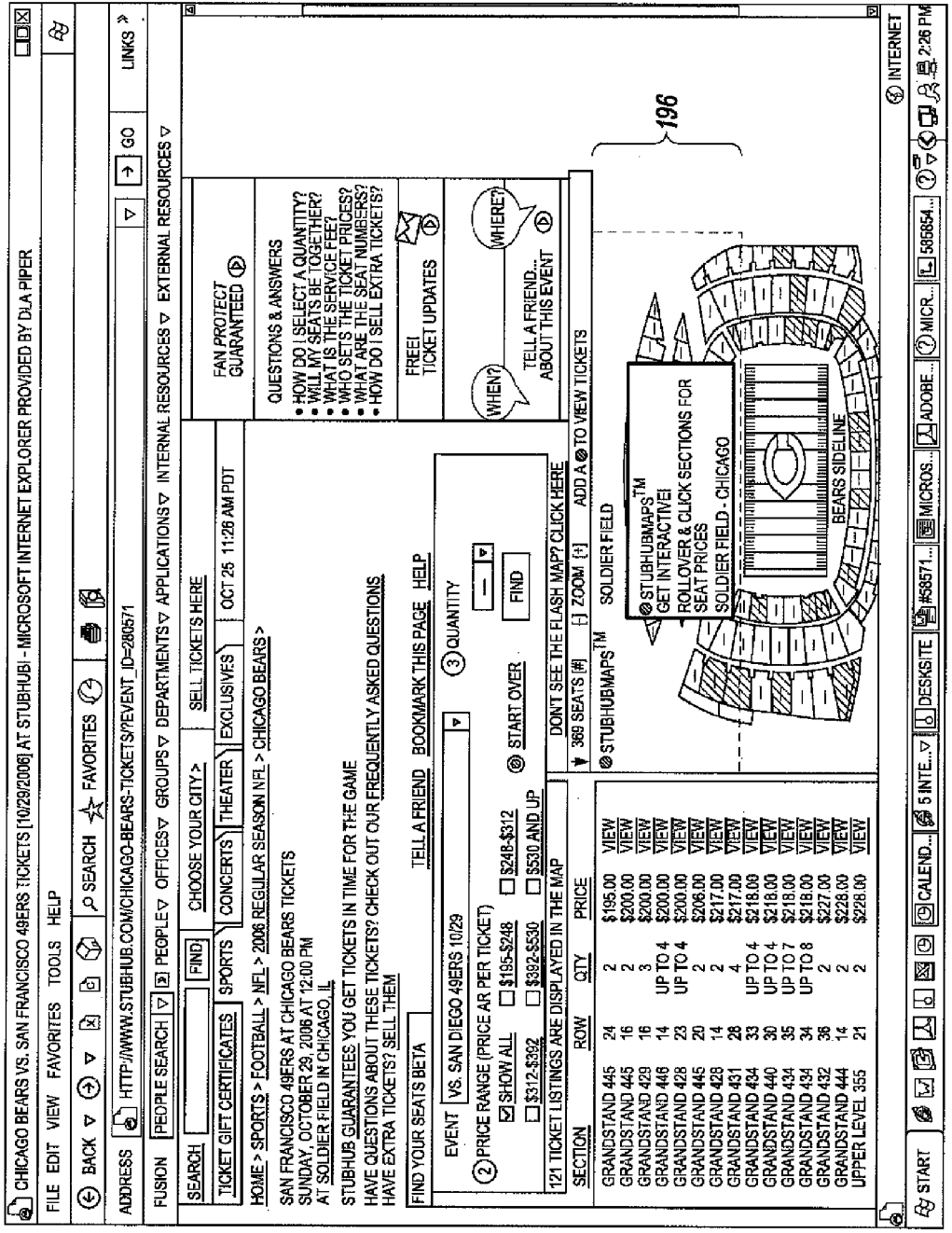
FIGS. 4-13 illustrate different optional features of the event venue map, according to several embodiments of the invention.
Figure 9:
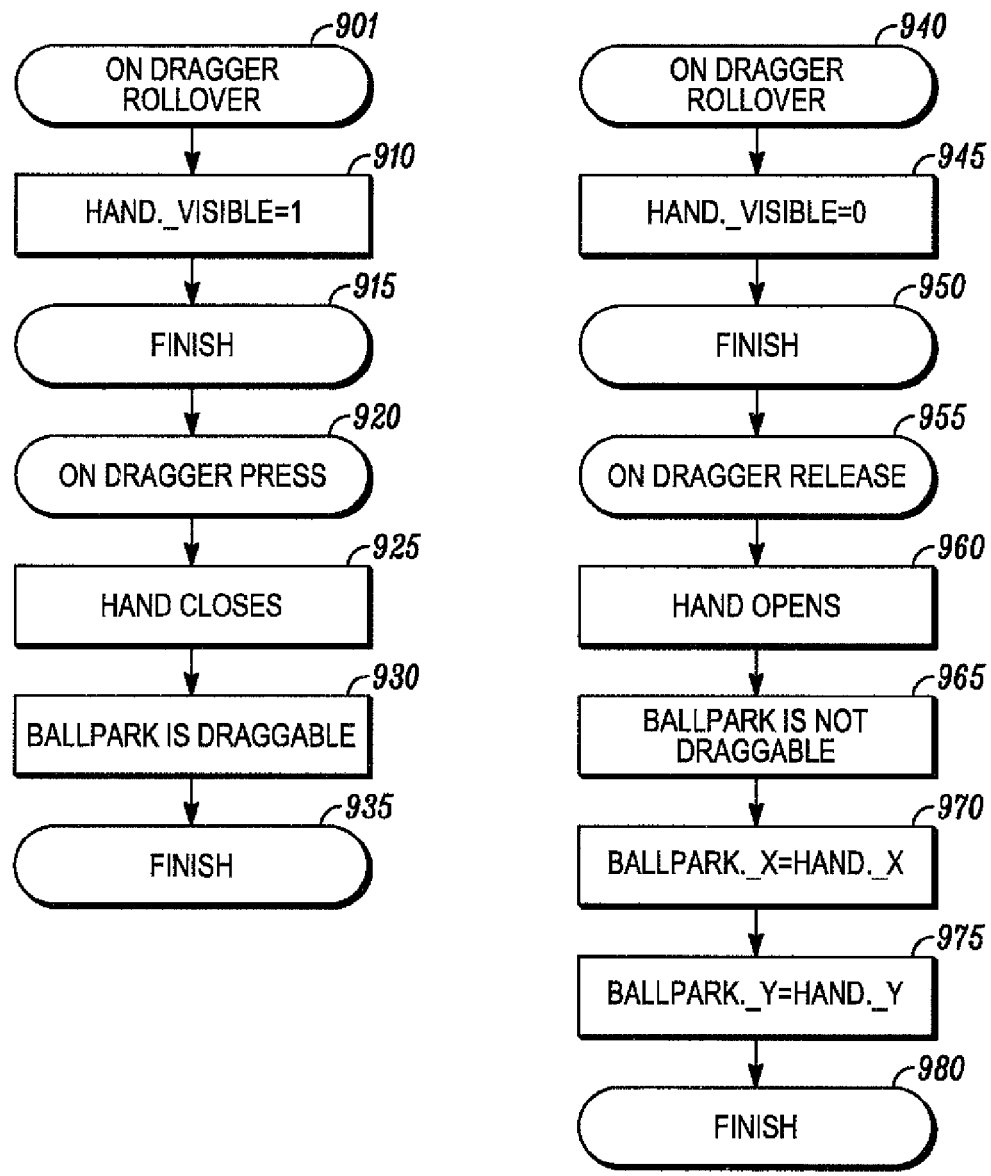

FIGS. 9 and 11 illustrate several dragger features, according to one embodiment of the invention. As discussed above, the dragger "Click Here To Drag" allows the user to move the event venue map in order to get a better view of the sections, and is illustrated in FIGS. 1G-1H. The dragger rollover feature 193 allows the user to see a hand when the mouse is over the "Click Here To Drag" dragger. This allows the user to click on the dragger and drag the map. The dragger press and release feature 192 makes it so that no hand is visible when the mouse is not over the "Click Here To Drag" dragger. Thus, the user may not enable the dragger when the mouse is not over the dragger. Referring to FIG. 9, in 901, the on dragger rollover feature is chosen. In 905, the hand icon visible is set to "on", and the hand icon is visible. This is a picture of a hand that is visible over the event venue map, which allows the user to drag or move the event venue map to see different areas of the ballpark. In 915, the process is finished.

In 940, the on dragger rollout feature is chosen. In 945, the hand icon visible is set to "off", and the hand icon is not visible. In 950, the process is finished.

In 920, the on dragger press feature is chosen. In 925, the hand closes. In 930, the event venue map is dragged or moved to see different areas of the ballpark. In 935, the process is finished.

In 955, the on dragger release feature is chosen. In one embodiment, when the event venue map is zoomed in, a box appears which reads "Click Here To Drag". When the user's mouse moves over this box, the cursor is replaced with a hand. When the user clicks and holds the click while within the box, the "hand" closes as if to grab the map. While the mouse is pressed, the hand remains closed and the ballpark becomes moveable by the user. When the user releases the mouse, the hand opens, the ballpark is at the location the user moved it to, and the ballpark is no longer moveable. Thus, referring to FIG. 9, in 960, the hand opens, and in 965, the ballpark is not draggable. In 970 and 975, x=hand x, and y=hand y, which means that the event venue stays at the same x and y coordinates the user left them when dragging the hand icon. In 980, the process is finished.

FIG. 11 illustrates the on section rollover and rollout features, according to one embodiment of the invention. The section rollover feature is illustrated feature 108 in FIG. 1D.

In 1105 it is determined if the section color is on, meaning that tickets are available in that section. If yes, in 1110, the section box visible is set to on, which means that the rollover on top of the section is enabled. In 115, the section title is added. In 1120, the section's price range is included. In 1125, the section's quantities (i.e., how many tickets) are included. All of this information is shown on the section rollover feature for each section. In 1135, the process is finished. If, in 1105, the section color is not on, meaning that tickets are not available in that section, the process ends in 1135.

In 1140, the section rollout feature is chosen. As discussed above, in 1110 or 1130, an icon appears over the even venue map as a result of a section rollover. When that section is no longer rolled over, the user rolls out, and whatever appears in 1110 or 1130 is made invisible.

Figure 10:
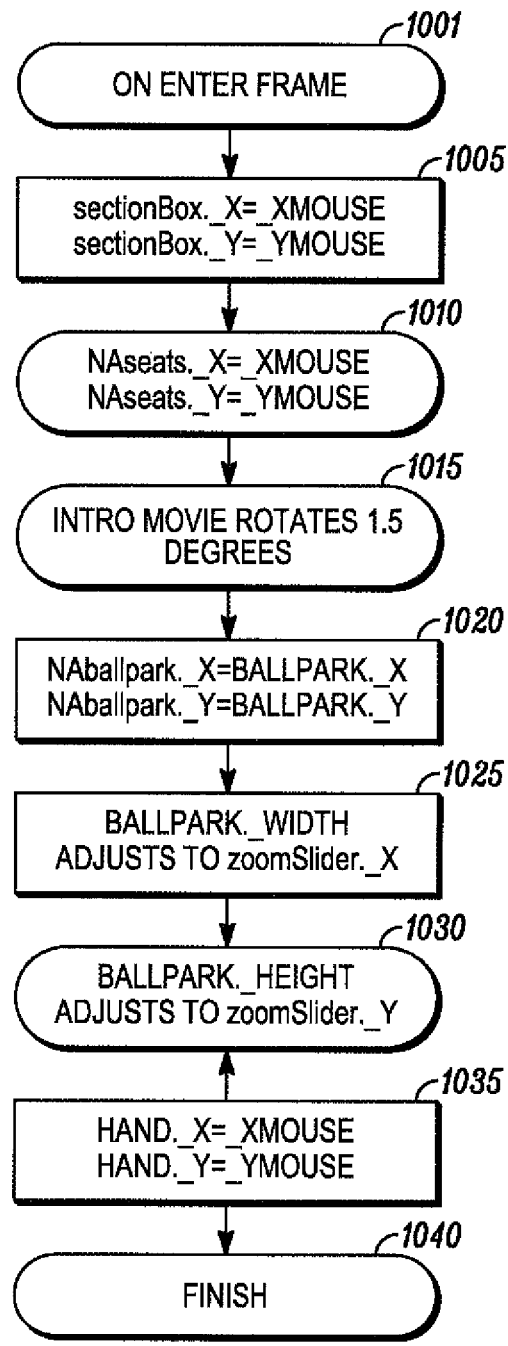
Figure 11:
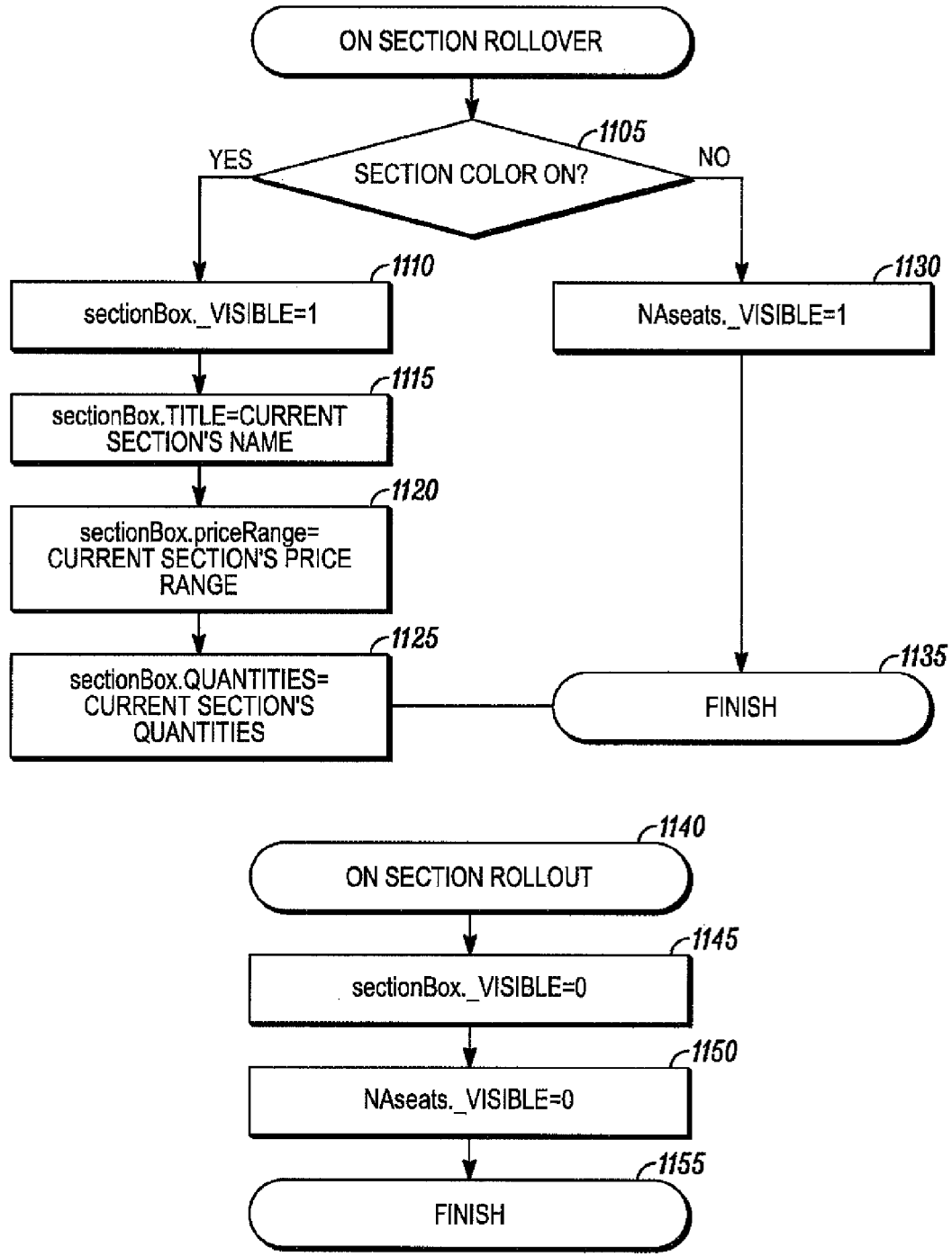

FIG. 10 illustrates one embodiment of how frames are refreshed with a series of functions, according to one embodiment of the invention. Those of ordinary skill in the art will recognize that FLASH maps, in one embodiment, utilize animated movies, which require a new picture to be shown at certain preset intervals. At these intervals, the frame(s) is refreshed with a new picture. Referring to FIG. 10, in 1001, the frame is entered. In 1005, the section box's X and Y coordinates are set to that of the mouse so that it appears to move with the mouse when visible. In 1010, the unavailable (or not available NA) seats object's X and Y coordinates are set to those of the mouse so they also appear to move with the mouse. In 1015, a rotating pinwheel 191 rotates (illustrated on FIG. 1I). The rotating pinwheel 191 indicates to the user that the event venue map is interactive. In 1020, the background NA ballpark object (which represents no ticket inventory) is set to the same X and Y coordinates as the ballpark object (which represents available ticket inventory) so that it moves with the ballpark in case of a zoom interaction. In 1025 and 1030, the ballpark's width and height adjust to whatever the zoom Slider's position is. In 1035, the hand's X and Y coordinates are set to those of the mouse so that it also appears to move with the mouse when visible.

Figure 12:
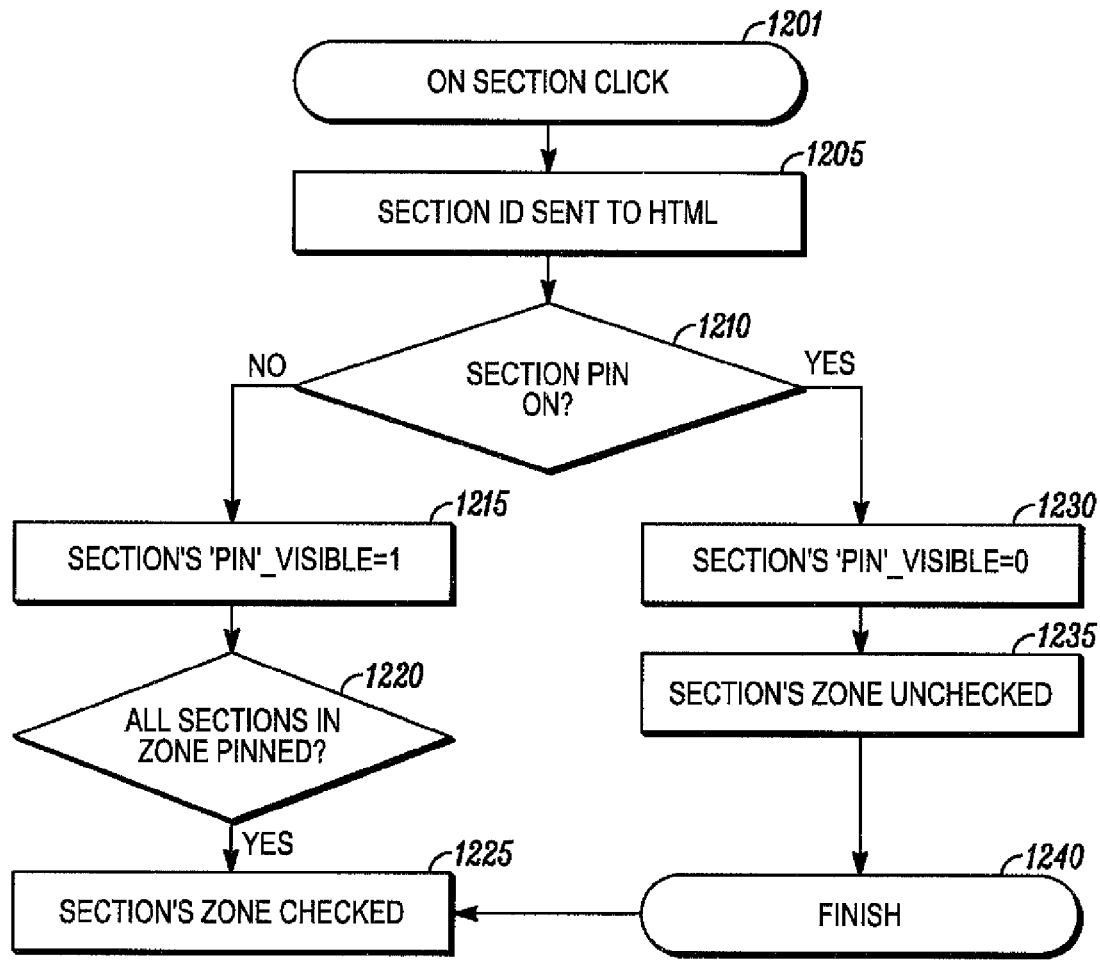

FIG. 12 illustrates the section click feature, according to one embodiment of the invention. The section click feature is shown as feature 109 in FIG. 1E. In 1205, the section ID is sent to the HTML ticket listing module 115. In 1210, it is determined if the section pin is on, meaning if there is a circle over the section that is chosen. If yes, in 1215, the section's pin is set to visible. In 1220, it is determined if all sections in the zone are pinned. If yes, the section's zones are checked. In 1240, the process is finished. If the answer to 1210 is no, in 1230, the section's pin is set to not visible. In 1235, the section's zone is unchecked. The process then finishes in 1240.

Figure 13:
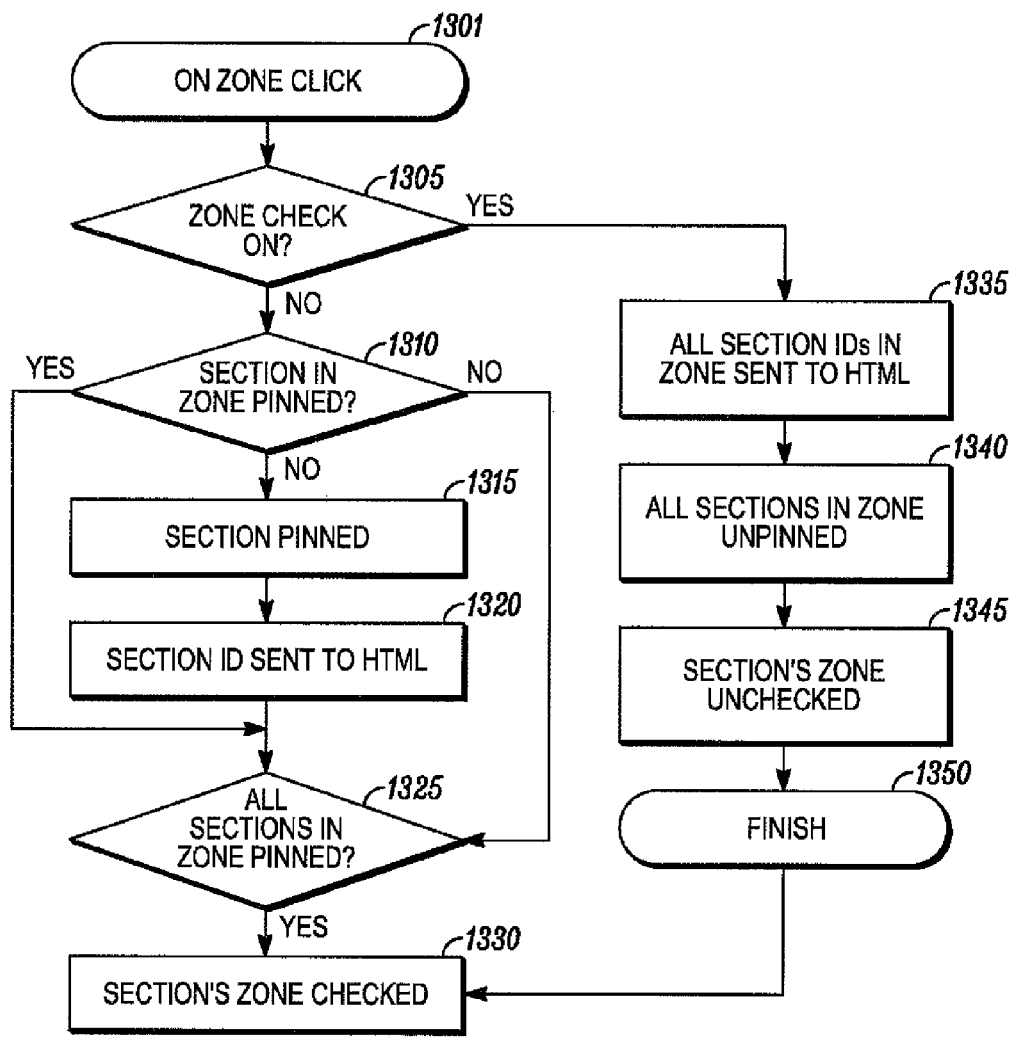

FIG. 13 illustrate the zone click feature, according to one embodiment of the invention. The zone click feature is shown as feature 118 in FIG. 1F. In 1305, it is determined if the zone check is on. If no, in 1310, it is determined if the section in the zone is pinned. If no, in 1315, the section is pinned, meaning that a circle is put on it. In 1320, the section ID is sent to the HTML ticket listing module 115. In 1325, it is determined if all sections in the zone are pinned. If yes, the section's zone is checked. If no, the process returns to 1310.

If the answer to 1305 is yes, and the zone check is on, in 1335 all section IDs in the zone are sent to the HTML ticket listing module 115. In 1340, all sections in the zone are unpinned. In 1345, the section's zone is unchecked. In 1350, the process finished.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

In addition, it should be understood that the figures, algorithms, and computer code, which highlight the functionality and advantages of the present invention, are presented for example purposes only. The architecture of the present invention is sufficiently flexible and configurable, such that it may be utilized in ways other than that shown in the accompanying figures, algorithms, and equations.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A method of illustrating locations of available tickets in an event venue, comprising:
   presenting, by a web browser of a client computing device, a user interface allowing a user to perform a search of tickets listed for sale by a ticket service hosted by a web site;
   accepting, at the user interface, event criteria for at least one ticket and at least one event;
   accepting, at the user interface, price criteria for the at least one ticket and the at least one event;
   displaying a ticket listing corresponding to tickets meeting the event criteria and the price criteria located in a plurality of sections of an event venue;
   displaying, by the web browser, an interactive graphics-based event venue map for the event venue illustrating locations of sections having tickets meeting the event criteria and the price criteria located at the event venue;
   accepting, at the interactive graphics-based event venue map, a particular section of interest in response to the user selecting the particular section from the interactive graphics-based event venue map; and
   displaying ticket information corresponding to tickets located in the particular section of interest as an overlay on the particular section of interest on the interactive graphics-based event venue map.

2. The method of claim 1, wherein user interactions with the interactive graphics-based event venue map to select one or more different sections of interest are reflected in the ticket information.

3. The method of claim 1, further comprising displaying the interactive graphics-based event venue map illustrating the location of all sections with at least one ticket meeting another received price criteria without requiring relaunching of the interactive graphics-based event venue map.

4. The method of claim 1, further comprising:
   accepting other section selection criteria at the interactive graphics-based event venue map; and
   displaying ticket information corresponding to the other section selection criteria without requiring relaunching of the interactive graphics-based event venue map.

5. The method of claim 1, wherein the ticket information for the tickets that meet the section selection criteria comprises one or more of listing information, transaction information, or bid information.

6. The method of claim 5, wherein the listing information comprises one or more of ticket information for at least one ticket that has not yet been sold at a fixed price; ticket information for at least one ticket that has not yet been sold at a declining price; or ticket information for at least one ticket available for auction.

7. The method of claim 5, wherein the transaction information comprises prices at which tickets have been sold.

8. The method of claim 5, wherein the bid information comprises prices at which buyers are willing to pay for tickets.

9. The method of claim 1, further comprising displaying graphics-based event venue map information that is not interactive showing an exact location corresponding to an exact ticket prior to purchase of the exact ticket.

10. The method of claim 1, wherein the interactive graphics-based event venue map is a FLASH-based event venue map.

11. A system residing on a computing device comprising non-transitory computer code that, when executed by the computing device, causes the computing device to perform a method for illustrating locations of available tickets in an event venue, the method comprising:
   receiving event criteria for at least one ticket and at least one event;
   receiving price criteria for the at least one ticket and the at least one event;
   causing a ticket listing to be displayed corresponding to tickets meeting the event criteria and the price criteria located in a plurality of sections of an event venue;
   causing an interactive graphics-based event venue map to be displayed for the event venue illustrating locations of sections having tickets meeting the event criteria and the price criteria located at the event venue;
   receiving, through the interactive graphics-based event venue map, a particular section of interest in response to the user selecting the particular section from the interactive graphics-based event venue map; and
   causing ticket information to be displayed corresponding to tickets located in the particular section of interest as an overlay on the particular section of interest on the interactive graphics-based event venue map.

12. The system of claim 11, wherein user interactions with the interactive graphics-based event venue map to select one or more different sections of interest are reflected in the ticket information.

13. The system of claim 11, wherein the method further comprise causing the interactive graphics-based event venue map to be displayed illustrating the location of all sections with at least one ticket meeting the other price criteria without requiring relaunching of the interactive graphics-based event venue map.

14. The system of claim 11, wherein the method further comprises:
   receiving other section selection criteria at the interactive graphics-based event venue map; and
   causing ticket information to be displayed corresponding to the other section selection criteria without requiring relaunching of the interactive graphics-based event venue map.

15. The system of claim 11, wherein the ticket information for the tickets that meet the section selection criteria comprises one or more of listing information, transaction information, or bid information.

16. The system of claim 15, wherein the listing information comprises one or more of ticket information for at least one ticket that has not yet been sold at a fixed price, ticket information for at least one ticket that has not yet been sold at a declining price, or ticket information for at least one ticket available for auction.

17. The system of claim 15, wherein the transaction information comprises prices at which tickets have been sold.

18. The system of claim 15, wherein the bid information comprises prices at which buyers are willing to pay for tickets.

19. The system of claim 11, wherein the method further comprises causing graphics-based event venue map information to be displayed that is not interactive showing an exact location corresponding to an exact ticket prior to purchase of the exact ticket.

20. The system of claim 11, wherein: the interactive graphics-based event venue map is a FLASH-based event venue map.

* * * * *